Patented July 27, 1943

2,325,567

UNITED STATES PATENT OFFICE 2,325,567

N-POLYALKYLENE POLYAMINOMALONAMIDE

Louis H. Bock, Huntingdon Valley, and Alva L. Houk, Philadelphia, Pa., assignors to Röhm & Haas Company, Philadelphia, Pa., a corporation of Delaware No Drawing. Application April 9, 1941, Serial No. 387,681

12 Claims. (Cl. 260—482)

This invention relates to N-polyalkylene polyaminoamides of malonic acid and to a method for their preparation.

The polyalkylene polyaminoamides have been found to be different from the simple amides of malonic acid in that they are more water-soluble. They differ in this respect also from the N-bis-(aminoalkyl) amides which may be formed along with polymeric products when an excess of a diamine is reacted with malonic acid. The N-polyalkylene polyaminomalonamides, however, are primarily monomeric and are definitely basic in character.

The object of this invention is the provision of water-soluble amides of a basic character. Another object is the provision of basic amides which are capable of reacting with formaldehyde to form water-soluble resinous condensates which may be converted to insoluble resins on heating.

It has now been found that the above amides can be readily prepared by reacting polyalkylene polyamines with a malonic ester. The reaction may be performed on mixing the two reactants directly or in a suitable solvent such as toluene or dioxane. Although reaction between the polyalkylene polyamines and the malonic ester begins at room temperature, the reaction mixture may be heated below about 200° C. to hasten and complete the reaction. Alcohol is formed in the reaction and may be distilled from the reaction mixture at normal or reduced pressures. The polyaminoamides which result are soluble not only in water but in many organic solvents. They form amine salts with organic or inorganic acids.

An ester of malonic acid may be used as one of the reactants, the most suitable and convenient being dimethyl or diethyl malonate. While esters with longer alcohol groups, propyl, butyl, etc., may be used, the esters with small alcohol groups are in general economically desirable as the alcohol group itself does not form a part of the desired final product.

The polyalkylene polyamines which are useful in this reaction contain at least three nitrogen atoms which are separated by alkylene groups having chains of at least two carbon atoms each. Typical of these polyamines are diethylene triamine, triethylene tetramine, tetraethylene pentamine, and other polyamines of this series, N,N'-bis(aminopropyl)ethylene diamine, tripropylene tetramine, and other polyalkylene polyamines. The most readily available are the polyethylene polyamines. There may also be used commercially available mixtures of polyamines.

The following examples illustrate the preparation of the N-polyalkylene polyaminomalonamides.

Example 1

A mixture of 40 parts of diethyl malonate and 26 parts of diethylene triamine was allowed to stand for two hours. It became warm and viscous with development of a red-green fluorescence. The liberated ethanol was distilled off at reduced pressure. The residue amounting to 46 parts was a very thick, sticky, balsam-like material which acquired a rose-tan fluorescence on standing. It contained by analysis 19.8% nitrogen, which may be compared with the theoretical nitrogen content for mono-N-aminoethylaminoethyl malonamide monoester of 19.3%. The product is soluble in water and in alcohol but does not dissolve in hydrocarbons.

Example 2

A mixture of 160 parts of diethyl malonate and 206 parts of diethylene triamine was allowed to stand one-half hour. Since the action was exothermic, the mixture became warm. It turned red in color. After the initial reaction, the mixture was heated to 115° C. and 64 parts of ethanol were distilled therefrom. The reaction product was cooled, yielding a rose-colored, soft solid which corresponds to N,N'-bis(aminoethylaminoethyl) malonamide.

Example 3

A mixture of 23 parts of diethyl malonate and 43 parts of triethylene tetramine stood three days at room temperature. It became viscous, acquired a deep red-green fluorescence, and gradually changed into a soft solid. Alcohol was removed under reduced pressure with gentle heating. The final product corresponds to N,N'-bis (aminoethylaminoethylaminoethyl) malonamide.

Example 4

A mixture of 40 parts of diethyl malonate and 37 parts of triethylene tetramine stood twelve hours. It became a clear, cherry red, very viscous syrup, from which alcohol was removed under reduced pressure. The residual product is mono-N-aminoethylaminoethylaminoethyl malonamide ethyl ester.

Example 5

A mixture of 20 parts of diethyl malonate and 43.5 parts of N,N'-bis(aminopropyl) ethylene diamine was heated to 200° C. in an oil bath.

Ethyl alcohol was evolved and, after the reaction was believed to be completed, the last traces of ethyl alcohol were removed by heating under reduced pressure. The residue was an amber-colored syrup, corresponding in composition to N,N'-bis-(aminopropylaminoethylaminopropyl) malonamide.

The products resulting from the process illustrated above consists essentially of polyalkylene polyamino monoamides and diamides of malonic acid. The amido nitrogen atoms of these compounds hold a chain containing at least four carbon atoms interrupted by one or more —NH— groups to form alkylene groups each having at least two carbon atoms. The various products are soluble in water, dioxane, alcohol, and similar solvents.

The polyalkylene polyaminoamides are useful for the preparation of resins by reaction with an aldehyde. These resins are particularly valuable in finishing textiles.

We claim:

1. An aminoamide of malonic acid in which an amido nitrogen atom carries a saturated group terminating in a primary amino group and having a chain containing at least four carbon atoms interrupted by at least one —NH— group to form alkylene groups of two to three carbon atoms each.

2. An amino diamide of malonic acid in which each amido nitrogen atom carries one saturated group terminating in a primary amine group and having a chain containing at least four carbon atoms interrupted by at least one —NH— group to form alkylene chains of two to three carbon atoms each.

3. An aminoamide of malonic acid in which an amido nitrogen atom carries one saturated group terminating in an —NH₂ group and having a chain containing at least four carbon atoms separated by —NH— into ethylene groups of two carbon atoms each.

4. N-aminoethylaminoethyl amido ethyl malonate.

5. N,N' - bis(aminoethylaminoethyl) malonamide.

6. N,N'-bis(aminoethylaminoethylaminoethyl) malonamide.

7. The process of preparing N-polyalkylene polyaminoamides of malonic acid, which comprises mixing and heating between room temperature about 200° C. a malonic ester and a diprimary polyalkylene polyamine containing at least four carbon atoms separated by at least one —NH— group into alkylene chains of two to three carbon atoms each between nitrogen atoms.

8. The process of preparing N-polyalkylene polyaminoamides of malonic acid, which comprises reacting by mixing one equivalent of a malonic ester with at least one equivalent of a diprimary polyalkylene polyamine containing at least four carbon atoms separated by at least one —NH— group into alkylene chains of two to three carbon atoms each between nitrogen atoms, said reaction forming polyalkylene polyaminoamide and alcohol, and removing the alcohol.

9. The process of preparing N-polyalkylene polyaminoamides of malonic acid which comprises mixing one equivalent of diethyl malonate with at least one equivalent of a diprimary polyalkylene polyamine containing at least four carbon atoms separated by at least one —NH— group into alkylene chains of two to three carbon atoms each between nitrogen atoms.

10. The process of preparing N-polyethylene polyaminoamides of malonic acid which comprises mixing one equivalent of a malonic ester with at least two equivalents of a diprimary polyethylene polyamine having at least three nitrogen atoms separated by ethylene groups.

11. The process of claim 10 in which the polyethylene polyamine is diethylene triamine.

12. The process of claim 10 in which the polyethylene polyamine is triethylene tetramine.

LOUIS H. BOCK.
ALVA L. HOUK.